United States Patent [19]

Omiya

[11] Patent Number: 5,163,155
[45] Date of Patent: Nov. 10, 1992

[54] SYSTEM FOR RESETTING A SERIES OF LATCHES TO VARYING DATA PATTERNS

[75] Inventor: Yasuhito Omiya, Kanagawa, Japan

[73] Assignee: Mitsubishi Denki Kabushiki Kaisha, Japan

[21] Appl. No.: 361,982

[22] Filed: Jun. 6, 1989

[30] Foreign Application Priority Data

Jun. 7, 1988 [JP] Japan .................. 63-139914

[51] Int. Cl.⁵ .............................. G06F 13/00
[52] U.S. Cl. .................. 395/800; 364/DIG. 1; 364/965.7; 364/244.5
[58] Field of Search ... 364/200 MS File, 900 MS File, 364/715.08; 395/DIG. 1, DIG. 2; 377/64, 66, 67, 65, 68, 75; 347/69, 70, 57, 77

[56] References Cited

U.S. PATENT DOCUMENTS

| | | | |
|---|---|---|---|
| 4,284,953 | 8/1981 | Hepworth et al. | 377/64 |
| 4,648,105 | 3/1987 | Priebe et al. | 377/64 |
| 4,905,241 | 2/1990 | Schmid et al. | 371/22.5 |

FOREIGN PATENT DOCUMENTS 63-44250  2/1988  Japan .

OTHER PUBLICATIONS

Karl Reib, "Integrated Logic Units A Short Course", Siemens Aktiengesellschaft, 1960, pp. 56-63.

*Primary Examiner*—Thomas C. Lee
*Assistant Examiner*—Robert B. Harrell
*Attorney, Agent, or Firm*—Wolf, Greenfield & Sacks

[57] ABSTRACT

Provided is a reset system for resetting a plurality of registers in a data processing system. The system resets the registers to a predetermined pattern of "0's" and "1's" that is determined by the positioning of the registers along a data scan path. A group of registers to be reset to "0" are serially connected and a group of registers to be reset to "1" are similarly serially connected. An inversion gate is provided in the serial path between the group of registers to be reset to "0" and the group to be reset to "1". Each register is comprised of two latches which can each be enabled such that data can propagate through the entire scan path without requiring multiple clock transitions. In order to reset the system, the enable signals for the latches are asserted. Thereafter, an initial reset value is scanned into a first register of the scan path and propagates through the entire path. When the initial reset value passes through the inversion gate, it assumes the inverted value for resetting the group of registers following the inversion gate.

7 Claims, 4 Drawing Sheets

SYSTEM FOR RESETTING A SERIES OF LATCHES TO VARYING DATA PATTERNS

FIELD OF THE INVENTION

The present invention relates to a reset system for use in a data processing unit in which a register is comprised of latches, and more particularly to a fast speed reset system.

BACKGROUND OF THE INVENTION

In order to explain the prior art and the present invention, an equivalent logic circuit according to an example register comprised of latches will first be described with reference to FIG. 5. As shown, the register 1 comprises two latches 1a and 1b, a selector 1c for selecting an input, and OR gates 1d and 1e for respectively feeding two kinds of clocks to the latches 1a and 1b, and further has a data input terminal 1f, a scan input terminal 1g, a mode change input terminal 1h for changing the mode between normal mode and scan mode, clock input terminals 1i and 1j, scan clock input terminals 1k and 1l, a data output terminal 1m and a scan output terminal 1n which may also serve to output data. When the latch 1b is exclusively used for scanning purposes, the OR gate 1e and the clock input terminal 1j will be unnecessary.

FIG. 6 is a block diagram showing an arrangement of a scan path used in the conventional data processing unit. As shown, reference numeral 8 indicates an LSI, or printed circuit board, or a combination thereof which may constitute the data processing unit. The system 8 has a plurality of registers 1 as described above, reference numeral 2 denoting a scan input terminal, 3 a scan output terminal, 4 an input terminal for changing the mode between normal mode and scan mode, 5 a scan A clock input terminal, and 6 a scan B clock input terminal. Registers 1 are each connected to each of the input and output terminals as shown while the scan output terminal 1n of a preceding stage register 1 is sequentially connected to the scan input terminal 1g of the next stage register 1 to form a scan path.

The operation of the above-described system is described hereinafter by referring to FIGS. 5 and 6. The operation is split into normal and scan modes. These modes are switched in accordance with the value applied to the mode change input terminal 4 which may be controlled by a service processor.

In normal mode, each clock applied to the scan A clock input terminal 5 and the scan B clock input terminal 6 are set to be turned off. Data are set into the latch 1a from the data input terminal 1f of each register via the selector 1c by the clock from the clock input terminal 1i. If the OR gate 1e and the clock input terminal 1j are present and a clock has been fed to this clock input terminal 1j, the value in the latch 1a is transferred to the latch 1b.

In scan mode, A clock and B clock which alternately into a significant state are applied to the scan A clock input terminal 5 and the scan B clock input terminal 6 respectively, and accordingly the scan clock input terminals 1k and 1l of each register 1 are alternately switched into a significant state. As the same time, scan data is applied thereto from the scan input terminal 2 and is passed through the scan input terminal 1g, and the latches 1a and 1b of the first stage register 1 are sequentially set to the latches 1a and 1b through the scan input terminals 1g of the next stage register etc. At the same time, the value of each register 1 is transmitted through the scan output terminals 1n and 3 to be taken out to the exterior. During the scan, the clocks set to off-state.

Meanwhile, a reset operation is conducted as follows. The clocks applied to the clock input terminals 1i and 1j of each register 1 are previously set to off-state, the mode change input terminal 4 is set to the scan mode and the scan input terminal 2 is set to "0". Next, the clocks applied to the scan A clock input terminal 5 and the scan B clock input terminal 6 are both set to on-state. Since the data directly passes through the latch when the clocks are turned on, "0" input from the scan input terminal 2 will be sequentially transmitted through the registers 1. Since the propagation speed is only retarded by the gate delay, the reset operation can be processed at a speed 100 to 1000 times as high as in the above-described scan mode operation where the clocks are alternately applied. After the value of "0" has been propagated to all of the registers 1, the clocks applied to the scan A clock input terminal 5 and the scan B clock input terminal 6 are turned off, and all of the registers 1 are set to "0" and the reset action is completed.

Since the conventional reset system has the arrangement described above, resetting all registers to "0" can be done at high-speed, but it has been necessary when resetting to a pattern including "1" to resort to an operation of applying the clocks alternately, as described-above, which has made it difficult to achieve a fast reset action. In general, if odd parity is used as a parity bit, the need arises to reset to a pattern including "1".

SUMMARY OF THE INVENTION

The present invention was conceived to eliminate the above-described problems, and aims at providing a reset system of data processing unit in which registers can be reset at high-speed to a pattern combining "0" and "1".

According to the reset system in accordance with the present invention, the scan input terminal of the first stage is fixed to a desired value ("0" or "1") while the scan clock input terminal of each register is fixed to a significant state (on) and an inversion gate or an inverted output of the preceding register is used for connection between the desired registers along the scan path.

In this invention, the registers positioned along the scan path are grouped in accordance with a predetermined pattern combining "0" and "1" and the registers within the group set to "0" or "1" are chain-connected as before while the inversion gate is inserted between the last stage register in the preceding group and the first state register in the following group, or the inverted output (of the latch) of the above-mentioned last stage register is connected as a scan output terminal to the scan input terminal of the abovementioned first stage register. By adopting this arrangement, since the scan data passing through the scan path can be inverted at a desired position, each register can be reset at high speed to a pattern combining "0" and "1" by fixing the scan input data to "0" or "1" and by setting two scanning clocks in the on-state.

BRIEF DESCRIPTION OF THE DRAWINGS

An embodiment of the present invention is hereinafter described with reference to the accompanying drawings in which.

PREFERRED EMBODIMENTS OF THE INVENTION

Figure 1:
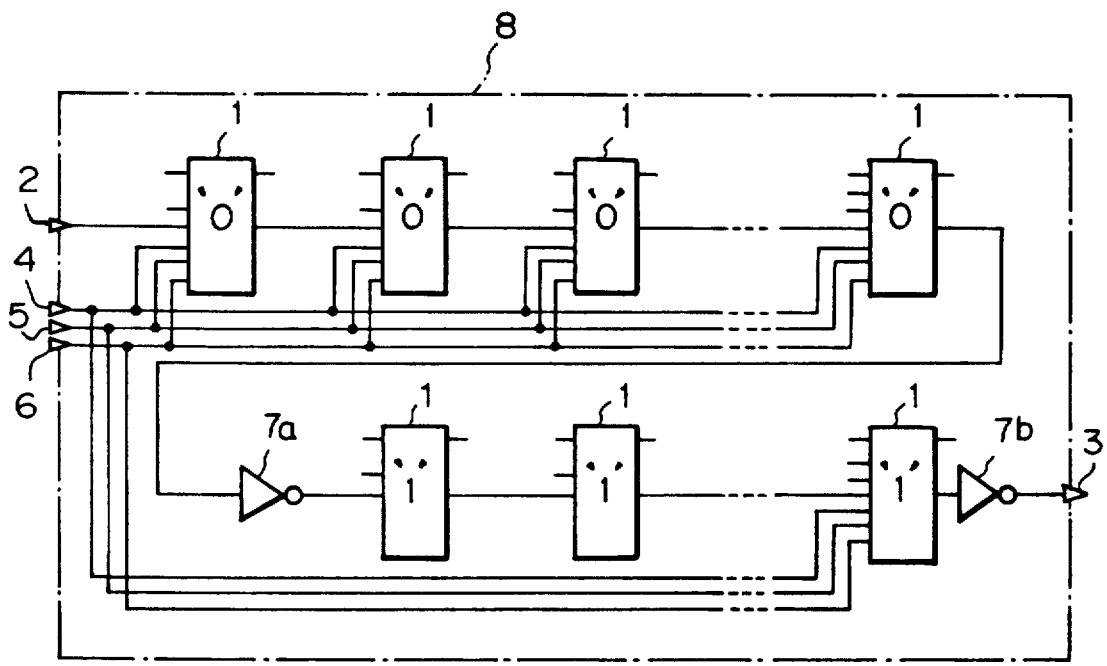
FIG. 1 is a block diagram of one embodiment of the present invention wherein all registers that are to be reset to a common value are grouped together and wherein a discrete inverter is utilized in the serial chain between the groups of registers.
Figure 5:
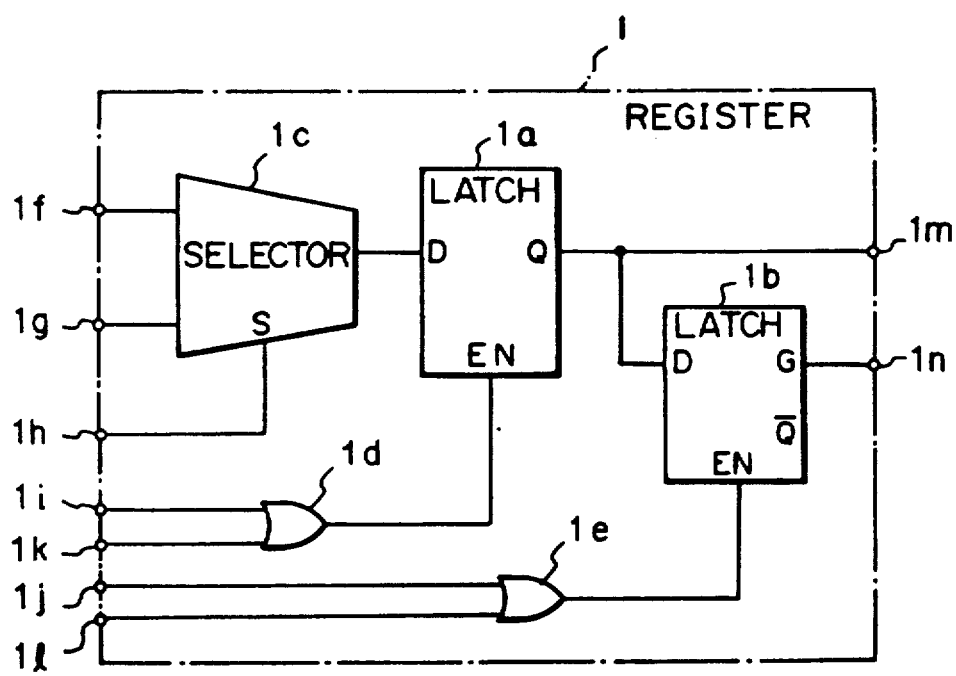
FIG. 5 is a structure diagram of registers used in the prior art and the present invention.
Figure 6:
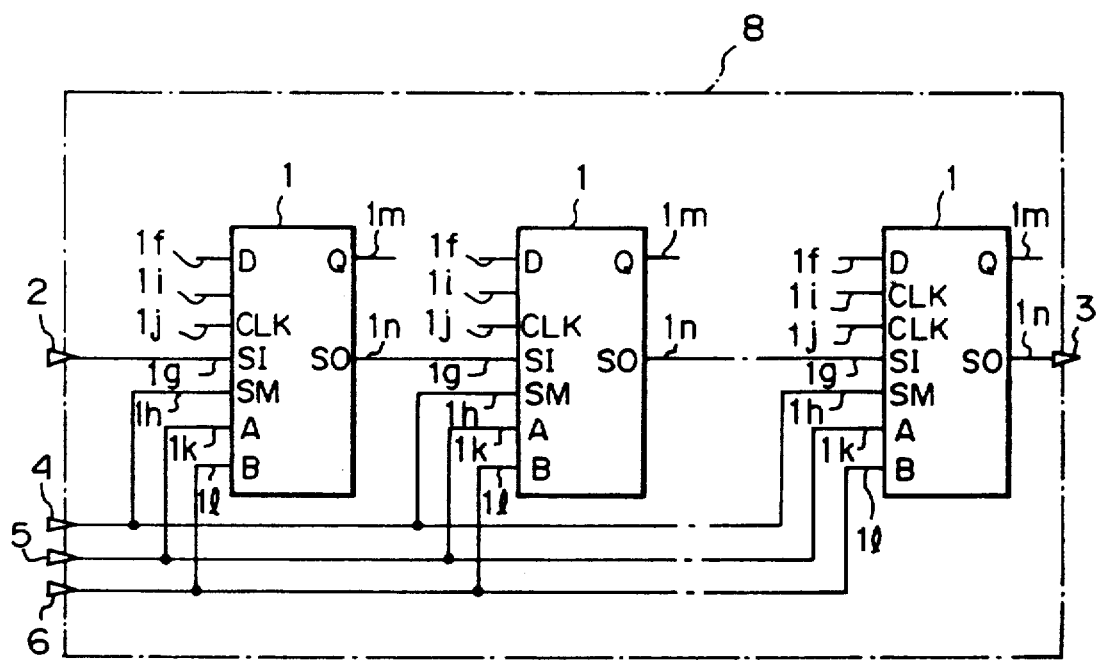
FIG. 6 is a block diagram illustrating a conventional example.

In FIG. 1, reference numerals 1 denote registers having the arrangement shown in FIG. 5, 2 denotes a scan input terminal, 3 denotes a scan output terminal, 4 denotes an input terminal for changing the mode between normal mode and scan mode, 5 denotes a scan A clock input terminal, 6 denotes a scan B clock input terminal. All of these may be the same as the conventional ones. Reference numeral 7a denotes an inversion gate which inverts the value of the scan data propagated along the scan path. The gate 7a is inserted between the last stage register 1 in the upper row and the first stage register 1 in the lower row of the drawing in order to connect them to each other. Connections other than those are the same as the conventional ones.

In the above-described embodiment, as before, the mode switching input terminal 4 is set to the scan mode and the clocks applied to the scan A clock input terminal 5 and the scan B clock input terminal 6 are both set to the on-state while the scan input terminal 2 is fixed to "0" so that scan data is transferred through the scan path to assume the value indicated within each register 1 of FIG. 1. After that, the clocks applied to the scan A clock input terminal 5 and the scan B clock input terminal 6 are turned off to allow for the delay time of the gate, then the reset operation is completed and each register 1 will be reset at a high-speed to a pattern combining "0" and "1". When the scan path is arranged, the order in which it is connected may be set without paying much attention to its logical meaning, so the registers to be reset to "0" are grouped and the inversion gate 7a is then connected thereto, and the registers finally being connected to be reset to "1" as a group.

Figure 2:
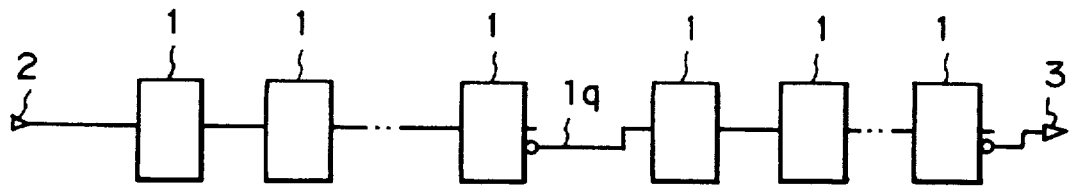
FIG. 2 is a block diagram of one embodiment of the present invention wherein all registers that are to be reset to a common value are grouped together and wherein an inverted output from a register in the first group of registers is utilized as an input to the second group.

Although, in the above-described embodiment, the inversion gate 7a is used, it may be arranged instead as shown in FIG. 2 by using the inverted output $\bar{Q}$ of the latch 1b as shown in FIG. 5. In FIG. 2, 1q is an inverted scan output terminal of the rearmost stage register 1 in the preceding group of registers.

Figure 3:
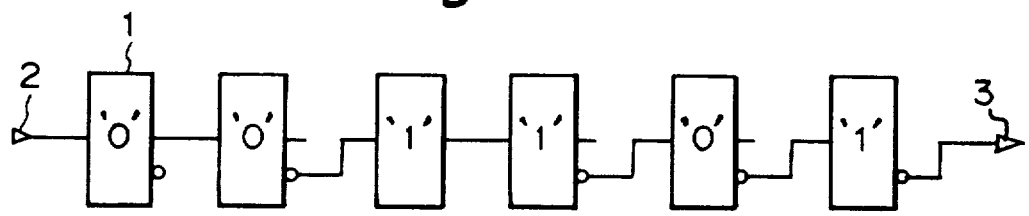
FIG. 3 is an embodiment of the invention wherein groups of registers to be reset to a common value are not directly coupled together.

Furthermore, in the above-described embodiment, the registers are divided into two groups to be reset to "0" and to be reset to "1", but can be divided into many further groups as seen in FIG. 3, in which they may be reset to a desired pattern combining "0" and "1".

The significant polarity (logical value) of the scan output terminal 3 may be the same as or opposite to that of the scan input terminal 2. Usually the polarities are set to coincide with each other since the scan path traverses a plurality of LSIs.

Figure 4:
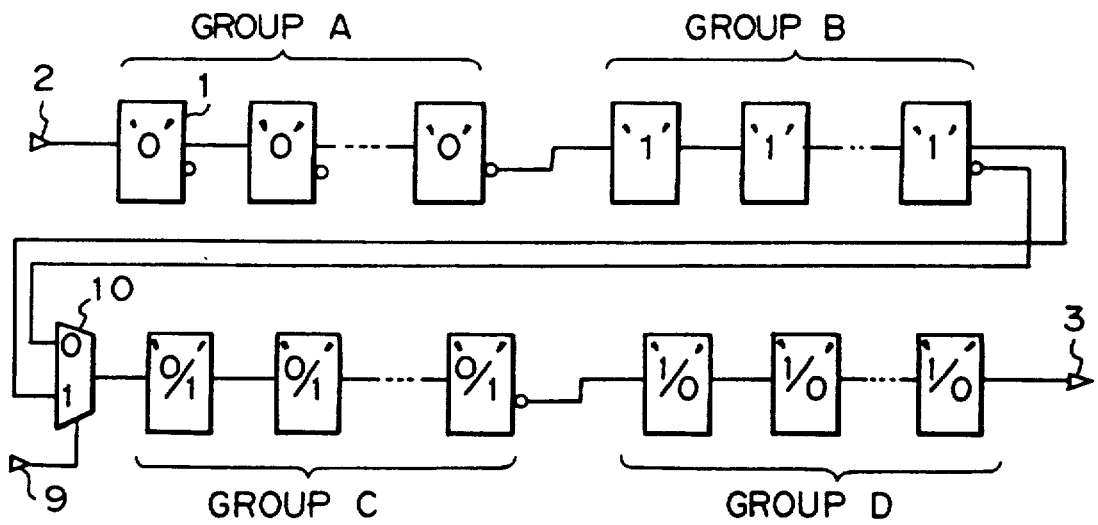
FIG. 4 is an embodiment of the invention wherein a multiplexer is utilized so that a group of registers can be alternatively reset to a first or second value.

Furthermore, when there are a plurality of patterns to be reset, it is possible to select them by providing a selection circuit on the way thereto, as shown in FIG. 4. In the example of FIG. 4, the registers 1 are divided into four groups: a group of registers A to be constantly reset to "0", a group of registers B to be constantly reset to "1", a group of registers C to be reset to the same value as that of a reset pattern selecting input terminal 9, and a group of registers D to be reset to the inverted value of that of the reset pattern selecting input terminal 9. Reference numeral 10 denotes a reset pattern selecting circuit and when the reset pattern selecting input terminal 9 is set to "0", the upper stage input will be selectively output, while when it is set to "1", the lower stage input will be output. The groups A and B are constantly reset to the values indicated in the drawing while the groups C and D are reset to the values at the left side of the ones indicated in the drawing when the terminal 9 is set to "0", and are reset to the values at the right side of the ones indicated in the drawing when the terminal 9 is set to "1". Even if the number of patterns is increased, the reset pattern may be selected in this way.

Moreover, when the reset pattern of "0" and "1" is altered due to design errors, it is also possible to reset the values by alternately applying the scan clocks. Therefore, the system according to subject invention allows for high speed and excellent flexibility.

As described above, according to the present invention, since the scan input terminal of the first stage register is fixed to a desired value while the scan clock input terminal of each register is fixed to a significant value and the inversion gate or the inverted output of the preceding register is used for connection between the desired registers along the scan path, it is possible to reset each register readily and at a very high-speed to a pattern including "0" and "1".

What is claimed is:

1. Reset system for resetting registers in a data processing unit having a plurality of registers, each register comprising latches and having a scan input terminal, a scan output terminal and a scan clock input terminal, wherein the scan output terminal of a preceding stage register is sequentially connected to the scan input terminal of a following stage register to form a scan path between a first stage register and a last stage register, characterized in that:
   a first register is resettable to a first value and a second register is resettable to a second value,
   the scan input terminal of the first stage register is fixed to said first value while the scan clock input terminal of each register is fixed to a significant value and;
   an inversion gate or inverted output of the first register is used for connecting between the first register and the second register disposed along the scan path.

2. A reset system for resetting registers in a data processing unit having a plurality of registers;
   each register comprising a first and second latch;
   each latch having a data input, a data output and an enable input, each latch transferring a value incident on its data input to its data output when a signal incident on its enable input has an enabling value;

each register having a scan data input, a scan data output a first scan clock input and a second scan clock input, the first and second scan clock inputs being respectively coupled to the enable inputs of the first and second latches;

the scan data output of each register being sequentially connected to the scan data input of a following stage register to form a scan path between a beginning stage register and an end stage register, said scan path including a first register and a second register;

means for simultaneously fixing the scan data input of the beginning stage register to a first value, the first scan clock input of each register to the enabling value for the first latch and the second scan clock input of each register to the enabling value for the second latch;

said scan path including inversion means for inverting a logical value, said inversion means being positioned between said first and second registers such that said first register can be reset to a first logic value and said second register can be reset to an inverted value of said first value.

3. A reset system as claimed in claim 2 wherein said scan path further includes a multiplexer having first and second data inputs, a selection input and an output, the first input of said multiplexer being coupled to the scan output of the first register, the second output of said multiplexer being coupled to an output of said inversion means, the output of said multiplexer being coupled to said second register such that the second register can be alternatively reset to either the first logic value or the inverted value of the first logic value.

4. A reset system for resetting registers in a data processing unit having a plurality of registers;

each register comprising a first and second latch;

each latch having a data input, a data output and an enable input, each latch transferring a value incident on its data input to its data output when a signal incident on its enable input has an enabling value;

each register having a scan data input, a scan data output a first scan clock input and a second scan clock input, the first and second scan clock inputs being respectively coupled to the enable inputs of the first and second latches;

the scan data output of each register being sequentially connected to the scan data input of a following stage register to form a scan path between a beginning stage register and an end stage register, said scan path including a first register and a second register;

the scan data input of the beginning stage register being fixed to a first logic value while the first scan clock input of each register is fixed to the enabling value for the first latch and the second scan clock input of each register is fixed to the enabling value for the second latch;

said scan path including inversion means for inverting a logical value, said inversion means being positioned between said first and second registers such that said first register can be reset to said first logic value and said second register can be reset to an inverted value of said first value.

5. A reset system as claimed in claim 4 wherein said scan path further includes multiplexer means for selecting one of two data inputs to be transferred to an output based upon the value of a selection input, said multiplexer means being positioned between said first and second registers;

said scan path further including means for respectively coupling said multiplexer means data inputs to the scan output of the first register and the output of the inversion means, said scan path further including means for coupling the multiplexer means output to the second register;

said reset system further including multiplexer control means for toggling the selection input such that the second register can be alternatively reset to either the first logic value or the inverted value of the first logic value.

6. A reset system for resetting registers in a data processing unit having a plurality of registers, each register including a plurality of latches, each register further including a scan input terminal, a scan output terminal and a scan clock input terminal, each register having means for passing data therethrough when a significant logical value is incident on the scan clock input, the reset system comprising:

means for coupling the scan output terminal of a preceding stage register to the scan input terminal of a following stage register to form a scan path between a first stage register and a last stage register;

means for fixing the scan input terminal of the first stage register to a first logical value while simultaneously fixing the scan clock input terminal of each register to the significant value; and inversion means for inverting a logical value, said inversion means being positioned along the scan path between the first register and the second register.

7. A reset system as claimed in claims 2, 4 or 6 including grouping means for forming first and second groups of registers such that each register within said first group is initialized to a first value and each register in said second group is initialized to a second value, said grouping means having means for forming said groups such that the registers within said first group form a serial chain that is uninterrupted by any register from said second group.

* * * * *